United States Patent Office 2,855,361
Patented Oct. 7, 1958

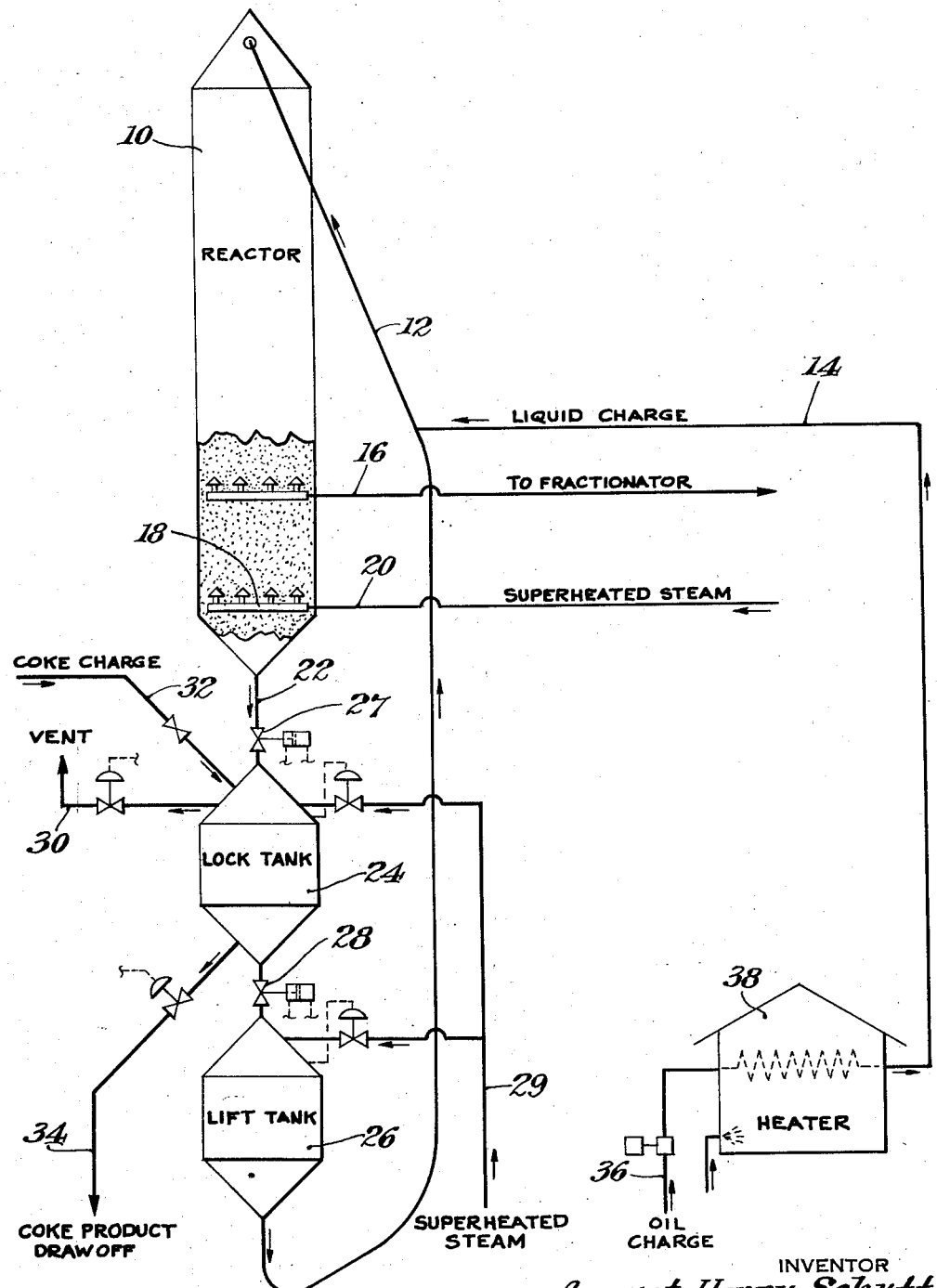

2,855,361

CONTINUOUS COKING

August Henry Schutte, Hastings-on-Hudson, N. Y., assignor to The Lummus Company, New York, N. Y., a corporation of Delaware Application October 28, 1954, Serial No. 465,342

4 Claims. (Cl. 208—126)

This invention relates to a continuous contact coking process for the conversion of heavy liquid hydrocarbons in liquid phase to gas or vapors and dry solids. It is a modification of the invention disclosed in the present pending application, Serial No. 252,306, filed October 20, 1951, now abandoned, and is an improvement on the disclosure in U. S. Patent 2,561,334 of which I am a co-inventor.

It has been established that the circulation of solid granular particles, particularly coke, through a reaction zone, a reheating zone, and a return conduit serves as an entirely satisfactory medium for transferring heat to heavy hydrocarbon residuum whereby complete conversion to gas and vapors and solids is possible. As described in the patent above referred to, it is the practice to pass the granular material downward as a compact gravity moving column through a closed reaction zone during which the liquid applied is converted into the desired end products. It has been found desirable to maintain the reaction conditions for at least five minutes by restricting the residence time of contact particles to complete reaction in order that the particles may go through the period of tackiness during movement and may thereafter be removed in a completely dry condition.

My past experience indicates that the heat exchange particles can be used for supplying the necessary heat of conversion to an oil charge that is relatively cooler than the particles themselves. If, however, the oil is at a temperature below reaction temperature it is necessary to reheat the particles to a relatively high degree and this has caused some complications because of the high temperature involved. Furthermore, it is relatively difficult to obtain absolute uniformity of coke particle temperature.

More recently, I have observed that the heat balance in the coke reactor does not require the large amount of heat heretofore thought necessary and it is now apparent that lower operating temperatures are entirely practical. This reduction in the temperature level reduces the gas and gasoline production with a corresponding increase in the yield of gas oil and makes for a more efficient unit.

In some cases it will be advantageous and economical to maintain the heat balance throughout the reactor by a combination of heat addition with the oil charge plus the introduction of superheated steam into a stripping section of the reactor at a temperature well above the average reaction temperature. The heat losses inherent in the exterior solids circulating system may also be compensated by utilizing highly superheated steam in the particle recirculation and elevating portion of the system.

In the contact coking systems covered by my previous Patents 2,561,420, 2,600,078 and 2,624,696, the solids were heated in a separate reheating zone to temperatures higher than the average reactor temperature and the heat required to complete the drying-out of the newly deposited coke film on the particles in the lower or stripping section of the reactor was provided by heat flow from the interior of the coke particle to its exterior surface.

In my present invention the newly formed coke film on the coke particles in the drying or stripping zone of the reactor is provided with heat for drying by direct contact between the outer surface of the particles and counterflowing superheated steam. It will be observed that my present system requires the addition of only enough heat to the particles to raise the temperature of the outside surface of these particles. This quantity of heat, which is supplied by the superheated steam at a temperature above that of the average reactor temperature is therefore much less than in the case of the previously disclosed mechanisms wherein the final drying-out of the coke film is accomplished by heat flow from the particle interior.

The primary advantage, however, of the lower heat requirement is that I now find it possible to increase the temperature of the feed stock, thus supplying the heat of vapors in a tubular heater and thereby eliminating the separate reheating of the coke. Such operation thus eliminates one of the major elements of apparatus and materially reduces the operating costs and controls.

More particularly, my present invention is based on the discovery that under suitable conditions the charge stock may be heated to a higher degree than required for the reaction and sufficient to be used to restore the nominal heat losses of particle heat exchange material by direct application of the heated charge stock during recirculation of the particles. The granular heat exchange material thus serves primarily as a surface for the deposit of coke and not primarily as a reservoir for reaction heat with the result that the design of the reactor may be based upon particle surface requirements rather than the solids-to-oil ratio dictated by heat balance requirements.

Further objects and advantages of my invention will appear from the following disclosure of a preferred form of embodiment thereof taken in connection with the attached drawing in which the figure is a schematic elevation with parts in section, of the major elements of a continuous contact coking system in accordance with my invention.

The preferred form of apparatus to carry out my invention generally includes a sealed reaction zone which may conveniently be a cylindrical vessel 10 through which coke particles are circulated in the system as hereinafter described. These particles, which may be as described in my patent, 2,600,078, are introduced into the reaction zone 10 through the inlet conduit 12. The liquid charge is preferably introduced to these coke particles while in the lift conduit 12 by the charge inlet line 14.

In the reaction zone 10 which is maintained at about 825 to 875° F., a rapid conversion of the charge material takes place with an outlet of the gaseous end products through the line 16. Below this gas and vapor outlet 16 is preferably mounted a stripper section 18 suitably fed by superheated steam at 20 to assure complete removal of all vapors and the complete drying of deposited carbon residue on the particles.

The coke particles continue to move by gravity and discharge through the outlet 22 into a lock tank 24 and then into a lift tank 26 from which they are elevated by mass lift flow, which may be as described in my Patent 2,684,929 through the lift conduit 12 to the top of the reactor. By the use of the tandem vessels 24 and 26 and suitable valves 27 and 28 as well as control steam through line 29 with appropriate controls not shown, it is possible to maintain a complete uniformity of coke particle flow and maintain a pressure within the reactor 10 of from one atmosphere to 100 p. s. i. g. It is, of course, understood that the lock tank 24 is provided with a suitable vent as at 30 and it may also be provided with a coke charge inlet shown at 32. If it is desired to remove coke particles, this may be done at 34 also under the control of a suitable separate valve.

In accordance with my preferred form of embodiment the oil charge at 36 is preferably pumped through a fluid heater 38 wherein it is heated to a temperature above the desired reaction temperature. Assuming for example a desired reaction temperature of about 850° F., it is found desirable to heat the oil to about 940° F.

Considering that some stocks would tend to coke under such temperatures it is contemplated that the heater 38 will be designed for a short residence time under a pressure of 10–100 p. s. i. g.

The application of the hot oil to the coke particles will restore the particle heat losses in the reactor and in the transfer from the reaction zone back to the upper part of the lift line and will bring such particles back to the desired reaction temperature. It is my experience that the particles, when not reheated, drop from 5–10° F. from the time of the reaction until they can be circulated to the upper part of the reaction zone.

Due to the ratio of oil to coke, which is about 1 part to 10 by weight and due to the differences in heat characteristics it is necessary to heat the oil to such a superior temperature of from 50° to 100° F. above the reaction temperature to establish the desired uniform temperature conditions in the reactor.

The condition of particle flow in the lift line must be such that premature coking of the oil charge will not occur and so that there will be nearly uniform distribution of the oil over the surfaces of recirculating particles.

I also find it desirable to supplement the heat in the reactor by the use of steam heated to about 1000° F. and introduced through the line 20 to the desired extent. The relatively small amount of heat available in this steam, above reaction temperature, is nevertheless very effective in that it heats the outer surface of the particles rapidly and dries out the newly deposited coke film. It will be understood that superheated steam will be removed with the vapors through the line 16 and will pass to a fractionator not shown.

It has been found that with operation under the above temperature conditions of about 940° F. for the oil charge and about 850° F. reaction temperature, it is possible to charge 1000 bbls. per day of a heavy residue to the coke particles which circulate at a rate of between 50 and 100 tons per hour.

The reactor pressure is set so as to obtain an average temperature high enough to permit substantial drying out of the coke particles before entering the lower section where they are stripped with high temperature superheated steam.

The particle size for uniform operation should not be of too broad a range and while I prefer to limit the range from about 1/16" to 3/4" major dimension, I have operated with as low as 50 mesh and as large as 1 1/2". I also find that the particles "grow" or increase in size by about .001 inch coating per pass.

A typical example of the application of a heavy hydrocarbon to a continuously moving petroleum coke particle mass is as follows:

Charge—18° A. P. I. Illinois reduced crude:
  Ramsbottom carbon—8.6 weight percent
  20% distillation temp.—755° F.
  50% distillation temp.—985° F.

Particle material—dense petroleum (equilibrium) coke:
  Size—average, 1/16 to 1" maximum.
  Apparent density—0.89 g./cc., or approx. 60 lbs. per cu. ft.
  Particle density—1.39 g./cc.; particle porosity approx. .03.

*Procedure.*—1000 bbls. per day of oil charge is introduced at 940° F. to the particle recirculation line; through which 70 tons per hour of dry coke is passed. Particle temperature in the recirculation line prior to entry of the charge is 845° F. The heat in the reactor is supplemented by the use of 600 lbs. per hour of superheated steam at a temperature of 1000° F. The temperature of the reactor outlet is 850° F.

The particles in the reactor column move downwardly from their point of entry for a distance of approximately 15 feet before reaching the bottom of the conversion zone and the average particle residence time is approximately 30 minutes to allow a full and complete conversion. The coke is removed as a free flowing homogeneous stream.

The foregoing example is illustrative of the operational features of my process but is not to be considered limiting thereof and I desire to comprehend within my invention such modifications as are included within the scope of the following claims.

I claim:

1. The method of continuously converting a charge of heavy liquid hydrocarbons into coke and lower boiling hydrocarbon vapors in the presence of discrete particles forming a contact mass, which comprises moving the particle mass downwardly through a reaction space as an unagitated gravity packed column, applying said charge to the particles at a temperature above the conversion temperature and above the temperature of the mass so as to heat the particles of such mass and maintain a reaction temperature sufficient for complete conversion of the charge, retaining the particles of said downwardly moving column in the reaction space after application of said charge for at least five minutes and sufficiently long to complete the conversion of said charge to a dry, non-agglomerating coke deposit on the particles and a vaporous product including lower boiling hydrocarbon vapors, injecting superheated steam into said reaction space adjacent the bottom thereof for completely drying said coke bearing particles, withdrawing the lower boiling hydrocarbon vapors and steam from the reaction space, separately withdrawing the particles bearing dry coke from said reaction space, and recirculating at least a portion of said coke bearing particles to the reaction space to provide the downwardly moving particle mass.

2. The method of continuously converting a charge of heavy hydrocarbons into dry carbon residue and lower boiling hydrocarbon vapors as claimed in claim 1 wherein the discrete particles are coke of at least 50 mesh and predominantly in the range of 1/16 to 3/4 inch in diameter.

3. The method of continuously converting a charge of heavy hydrocarbons into a dry carbon residue and lower boiling hydrocarbon vapors as claimed in claim 1 wherein the charge is heated to a temperature of from 50° to 100° F. above the reaction temperature to replace heat lost by the deposit bearing particles during recirculation and in which the pressure in the reaction section is from one atmosphere to 100 p. s. i. g. and the charge is applied to the recirculating particles.

4. The method of continuously converting a charge of heavy liquid hydrocarbons into coke and lower boiling hydrocarbon vapors in the presence of discrete contact particles, which comprises maintaining a descending unagitated gravity packed bed of particles within a reaction zone, continuously supplying particles to the upper portion of said bed, heating said heavy charge to a temperature above the conversion temperature and above the temperature of the particles supplied to said bed, applying said hot charge to the particles supplied to said bed whereby said particles are heated and said bed is maintained at a temperature sufficient for complete conversion of said charge, retaining the particles of said bed in said reaction zone after application of said charge for at least five minutes and sufficiently long to complete the conversion of said charge to a dry, non-agglomerating coke deposit on said particles and a vaporous product including lower boiling hydrocarbon vapors, injecting superheated steam into said reaction zone adjacent the bottom thereof for completely drying said coke bearing particles, withdrawing said lower boiling hydrocarbon vapors and steam from said reaction zone, separately withdrawing said coke bearing particles from said reaction zone, and recirculating at least a portion of said coke bearing particles to said reaction zone to provide the particles supplied to the upper portion of said bed.

References Cited in the file of this patent

UNITED STATES PATENTS

| | | |
|---|---|---|
| 2,477,502 | Utterback et al. | July 16, 1949 |
| 2,482,138 | Schutte | Sept. 20, 1949 |
| 2,482,139 | Schutte | Sept. 20, 1949 |
| 2,719,114 | Leffer | Sept. 27, 1955 |